United States Patent [19]
Murakami et al.

[11] 4,117,677
[45] Oct. 3, 1978

[54] STATOR FOR A TORQUE CONVERTER

[75] Inventors: Noboru Murakami, Nagoya; Choji Furusawa, Toyota, both of Japan

[73] Assignee: Aisin Seiki Kabushiki Kaisha, Kariya, Japan

[21] Appl. No.: 767,190

[22] Filed: Feb. 9, 1977

[30] Foreign Application Priority Data

Feb. 16, 1976 [JP] Japan .................................. 51/15555

[51] Int. Cl.² ............................................. F16D 33/00
[52] U.S. Cl. ........................................ 60/345; 60/362; 188/82.84; 188/291; 192/45; 308/207 R
[58] Field of Search ................... 188/82.84, 291, 296; 192/45; 60/345, 346, 361, 362; 74/677; 308/207 R, 216

[56] References Cited
U.S. PATENT DOCUMENTS

| | | | |
|---|---|---|---|
| 2,029,244 | 1/1936 | Linder | 192/45 |
| 2,209,459 | 7/1940 | Hill | 192/45 X |
| 2,232,090 | 2/1941 | Anderson | 192/45 |
| 3,343,367 | 9/1967 | General | 60/345 |
| 3,359,830 | 12/1967 | Liang | 74/677 X |
| 3,547,238 | 12/1970 | Harmon | 188/82.84 X |
| 3,904,005 | 9/1975 | Husmann | 192/45 |

Primary Examiner—George E. A. Halvosa
Attorney, Agent, or Firm—Sughrue, Rothwell, Mion, Zinn and Macpeak

[57] ABSTRACT

The stator assembly of a torque converter includes a stator wheel, a one-way brake for connecting the stator wheel to a stator shaft, a thrust washer provided on each side of the one-way brake and a pair of snap rings fixed to the stator wheel for locating the thrust washers. A gap is provided between the outer circumference of the thrust washer and the stator wheel to prevent undesirable engagement therebetween which would adversely effect the operation of the one-way brake.

3 Claims, 2 Drawing Figures

STATOR FOR A TORQUE CONVERTER

BACKGROUND OF THE INVENTION

1. Field of the Invention

The present invention is directed to a stator assembly and more particularly to a stator assembly for a torque converter.

2. Prior Art

In a conventional torque converter having a stator, rapid deceleration or acceleration of the stator wheel or a turbine runner often results in the entrainment of the thrust washer with the stator wheel or the turbine runner. This is due primarily to the fact that the thrust washer does not necessarily rotate coaxially relative to the stator wheel and the stator shaft since the gaps between the outer circumference of the thrust washers and the stator wheel and between the inner circumference of the thrust washers and the inner race of a one-way brake which is secured to the stator shaft are not uniform due to manufacturing tolerances. Under such adverse conditions the stator wheel is sometimes engaged by the outer circumference of the thrust washer thereby wearing the thrust washer and unbalancing the radial forces of the stator wheel thereby damaging the interaction between the inner race and the outer race of the one-way brake. The above mentioned damage can also occur when the thrust washer is held between a snap ring and the one-way brake.

SUMMARY OF THE INVENTION

The present invention provides a stator assembly for a torque converter which obviates the above mentioned conventional drawbacks. The present invention provides a unique and highly simplified stator assembly for a torque converter.

The present invention provides a new improved stator assembly wherein the gap between the outer circumference of the thrust washer and the stator wheel is maintained sufficiently large relative to the gap between the inner circumference of the thrust washer and the inner race of a one-way clutch which is secured to the stator shaft so that the outer circumference of the thrust washer will not contact the stator wheel during operation. Furthermore a snap ring is fixedly mounted on the inner surface of the stator wheel with sufficient clearance relative to the thrust washer so as not to hold the thrust washer between the snap ring and the one-way brake thereby preventing the damage referred to above with respect to conventional stator assemblies. The thrust washer and one-way brake are so arranged that axially directed thrust forces between a turbine runner and the stator assembly act only on the inner race of the one-way clutch which is secured to the stator shaft and are not transferred to the stator wheel or the outer race of the one-way brake.

A more complete appreciation of the invention and the many attendant advantages thereof will be readily apparent as the same becomes better understood by reference to the following detailed description when considered in connection with the accompaning drawings.

DETAILED DESCRIPTION OF THE INVENTION

Figure 1:
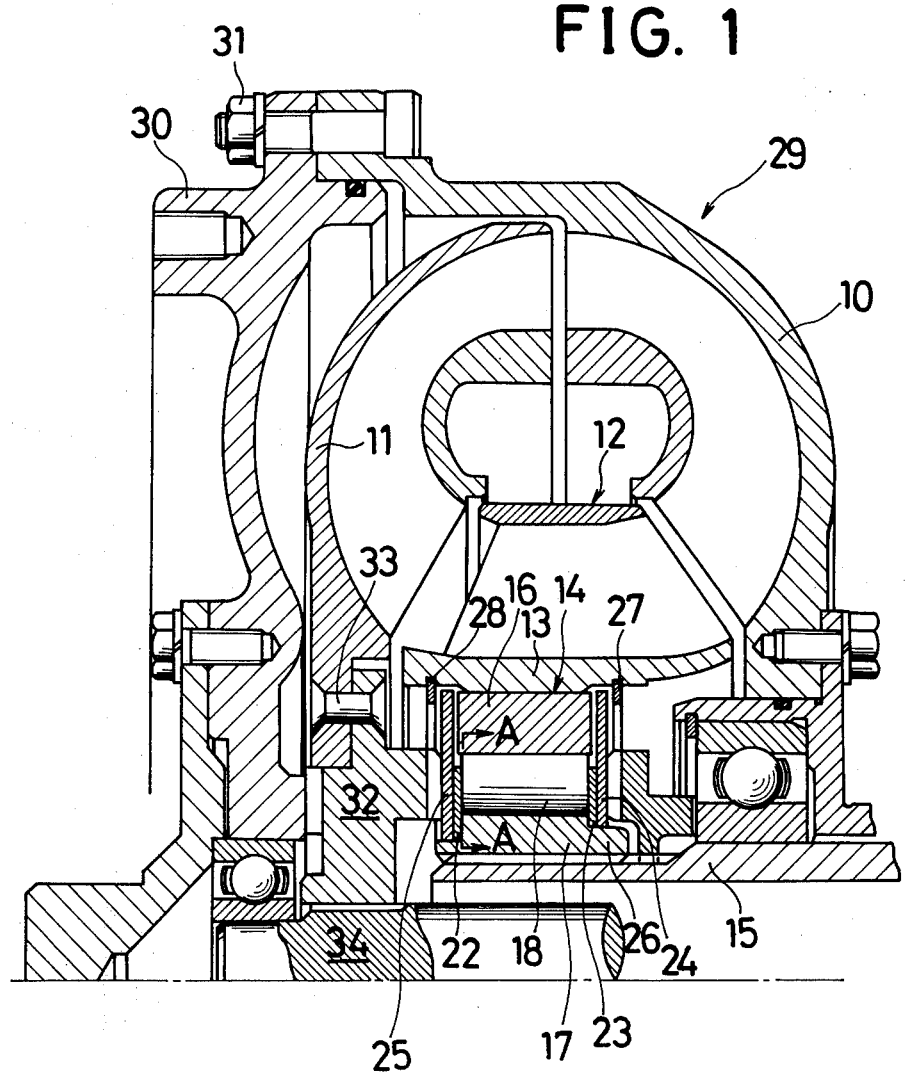
FIG. 1 is a longitudinal axial section of a torque converter embodying the stator assembly according to the present invention.

A torque converter 29 is comprised of a front disc or flywheel 30 adapted to be driven by an engine, not shown, and an impeller 10 which is secured to the front disc 30 by means of bolts 31. A turbine runner 11 is integrally connected to a turbine hub 32 by means of rivets 33 and the turbine hub 32 is connected to a turbine shaft 34 through a spline connection. The stator assembly 12 of the torque converter 29 is comprised of the stator wheel 13 and the one-way brake 14 disposed between the stator wheel 13 and the stator shaft 15.

The one-way brake 14 is comprised of an outer race 16 fixed to the inner circumference of the stator wheel 13, an inner race 17 connected to the stator shaft 15 by means of a spline connection and a roller 18 disposed in a wedge-shaped recess 20 provided in the outer circumference of the inner race 17. The roller 18 is located between the bottom wall 19 of the recess 20 and the inner circumference of the outer race 16 which is spaced from the outer circumference of the inner race 17. A leaf spring 21 is disposed within the wedge-shaped recess 20 for circumferentaily urging the roller 18 toward the shallow end of the recess 20. A pair of annular side plates 22 and 23 are provided for holding the rollers 18 and the leaf spring 21 within the wedge-shaped recess 20 as clearly viewed in FIG. 1. Alternatively the wedge-shaped recess 20 could be formed in the inner circumference of the outer race 16 instead of in the outer circumference of the inner race 17.

Thrust washers 24 and 25 are provided on opposite sides of the one-way brake 14 as a means for absorbing axial thrust during operation of the pump impeller 10 and turbine runner 11. The thrust washers 24 and 25 are freely located on the boss portions 26 of the inner race 17 and the outer circumferences of the thrust washers 24 and 25 are spaced a sufficient distance from the stator wheel 13. The thrust washers 24 and 25 are loosely located and retained on opposite sides of the one-way brake 14 by means of snap rings 27 and 28 which are fixed in grooves in the inner circumference of the stator wheel 13 and spaced from said one-way brake a distance greater than the thickness of said thrust washers.

The axial length of the outer race 16 of the one-way clutch 14 is shorter than the distance from the left side of the side plate 22 to the right side of the side plate 23 as viewed in FIG. 1. Accordingly the thrust washers 24 and 25 which bear against the side plates 23 and 22 respectively are spaced from the outer race 16. Thus any axial forces transmitted from the turbine runner to the stator assembly are transmitted through the turbine hub, thrust washer 25, side plate 22, inner race 17, side plate 23 and thrust washer 24 and no axial thrust forces are transmitted to the outer race 16 or the stator wheel 13.

Figure 2:
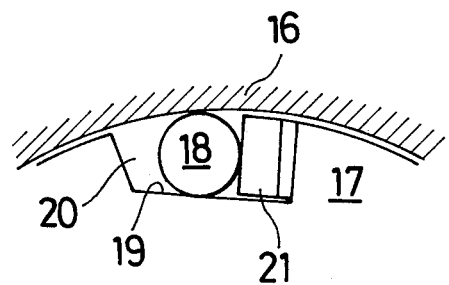
FIG. 2 is an enlarged sectional view taken along the line A—A in FIG. 1 showing a one-way brake.

In operation the front disc 30 is rotated by an engine, not shown, and the pump impeller 10 of the torque converter 29 rotates with the front disc 30. The fluid within the torque converter 29 fluidically acts on the turbine runner under centrifugal force produced by the rotation of the pump impeller 10 to thereby rotate the turbine 11 in the same direction as the direction of rotation of the pump impeller 10. The rotation of the turbine runner 11 is transmitted to the turbine shaft 34 through the turbine hub 32. During the initial operation of the torque converter the reversely directed fluid exiting from the blades of the turbine runner 11 impinge on the stator wheel 13 to rotate the stator wheel in the counterclockwise direction as viewed in FIG. 2 to lock the stator wheel to the stator shaft 15 through the engagement of the one-way brake 14. As the speed of the turbine increases the stator wheel 14 will be fluidically coupled with the impeller 10 and the turbine runner 11 for rotation in the same direction. Under such conditions the outer race 16 of the one-way brake 14 which is secured to the stator wheel 13 will rotate in the clockwise direction as viewed in FIG. 2 thereby overriding the one-way brake.

The gap between the outer circumferences of the thrust washers 24 and 25 and the stator wheel 13 is sufficiently large relative to the gap between the inner circumferences of the thrust washers 24 and 25 and the boss portions 26 of the inner race so that the thrust washers will never engage the stator wheel. Likewise the thrust washers 24 and 25 are sufficiently spaced from the outer race 16 of the one-way brake and the snap rings 27 and 28 secured to the stator wheel 13 so that the thrust washers 24 and 25 will never be entrained for rotation with the stator wheel 13 and none of the damage referred to above with respect to conventional stator assemblies can occur in the stator assembly according to the present invention.

Obviously many modifications and variations of the present invention are possible in light of the above teachings. It is therefore to be understood that within the scope of the appended claims the invention may be practiced otherwise and as specifically described herein.

What is claimed is:

1. A stator assembly for a torque converter comprising
   a stator shaft,
   a stator wheel concentrically located relative to said stator shaft,
   a one-way brake interposed between said stator shaft and said stator wheel including an outer race secured to the inner circumference of said stator wheel, an inner race secured to said stator shaft and roller means interposed between said inner race and said outer race for connecting said stator wheel to said stator shaft, said inner race including an axially extending boss,
   washers mounted on said boss with a clearance gap and a pair of thrust disposed between said stator wheel and said stator shaft on opposite side of said one-way brake with the outer circumferences of said thrust washers being sufficiently spaced at all times from the inner surface of said stator wheel,
   a pair of snap rings secured to said stator wheel on opposite side of said thrust washers at a distance from said one-way brake greater than the thickness of a respective thrust washer for locating said thrust washers adjacent said one-way brake, and
   a pair of annular plate means mounted on said base and interposed between each thrust washer and said inner race for holding said roller means of said one-way brake, the axial length of said outer race of said one-way brake is shorter than the distance from the outer side of one annular plate means to the outer side of the other annular plate means,
   whereby an axially directed thrust force against said thrust washers is transmitted through said plate means only to said inner race of said one-way brake.

2. A stator assembly for torque converter as set forth in claim 1, wherein the spacing between the outer circumferences of said thrust washers and said stator wheel is sufficiently large relative to said gap between the inner circumferences of said thrust washers and said boss of said inner race.

3. A stator assembly for torque converter as set forth in claim 1, wherien said thrust washer are sufficiently spaced from said outer race of said one-way brake and sad snap ring.